United States Patent
Shiozaki (10) Patent No.: US 9,898,131 B2
(45) Date of Patent: Feb. 20, 2018

(54) DISPLAY APPARATUS AND CONTROL METHOD OF DISPLAY APPARATUS

(71) Applicant: CANON KABUSHIKI KAISHA, Tokyo (JP)

(72) Inventor: Tomoyuki Shiozaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/272,273

(22) Filed: Sep. 21, 2016

(65) Prior Publication Data

US 2017/0090659 A1    Mar. 30, 2017

(30) Foreign Application Priority Data

Sep. 25, 2015    (JP) ................. 2015-188408

(51) Int. Cl.
*G06F 3/041*    (2006.01)
*G06F 1/16*    (2006.01)

(52) U.S. Cl.
CPC .......... *G06F 3/0416* (2013.01); *G06F 1/1652* (2013.01); *G06F 1/1677* (2013.01); *G06F 2203/04102* (2013.01); *G06F 2203/04103* (2013.01)

(58) Field of Classification Search
CPC .... G06F 1/1652; G06F 1/1677; G06F 3/0416; G06F 2203/04103; G06F 2203/04102
See application file for complete search history.

(56) References Cited

U.S. PATENT DOCUMENTS

| 2003/0227441 A1* | 12/2003 | Hioki | G06F 3/0412 |
| | | | 345/156 |
| 2004/0008191 A1* | 1/2004 | Poupyrev | G06F 3/011 |
| | | | 345/184 |
| 2006/0290390 A1* | 12/2006 | Jang | G11C 19/28 |
| | | | 327/112 |
| 2007/0085845 A1* | 4/2007 | Kikuchi | G06F 3/0412 |
| | | | 345/204 |
| 2008/0116944 A1* | 5/2008 | Tobita | G11C 19/28 |
| | | | 327/142 |
| 2011/0187681 A1* | 8/2011 | Kim | G06F 1/1652 |
| | | | 345/204 |

FOREIGN PATENT DOCUMENTS

JP    2008-171148 A    7/2008

* cited by examiner

*Primary Examiner* — Shaheda Abdin
(74) *Attorney, Agent, or Firm* — Canon U.S.A., Inc. IP Division (57) ABSTRACT

A display apparatus including a flexible display device includes a touch detection unit that detects a touch operation to the display device, a bending detection unit that detects a bending state of the display device, and a control unit that controls an operation according to a touch operation depending on the detected bending state, where the control unit differentiates the operation according to the touch operation between a case where a portion of the display device, which is less than a predetermined bending amount, is a greater than a predetermined threshold area and a case where the portion that is less than the predetermined bending amount is less than the predetermined area.

13 Claims, 5 Drawing Sheets

DISPLAY APPARATUS AND CONTROL METHOD OF DISPLAY APPARATUS

BACKGROUND

Field

Aspects of the present invention generally relate to a display apparatus and a control method of the display apparatus, and particularly relate to a flexible display having a touch operation device.

Description of the Related Art

In recent years, portable devices, such as digital cameras and mobile phones, have been required to achieve reduction in a size and weight to provide excellent portability and required to enable viewing of an image on a display having a high definition and a large screen. Thus, an information processing apparatus with a display apparatus, which realizes both portability and a large screen by using a display in a flexible sheet shape, which is thin and has flexibility (hereinafter, referred to as a flexible display), has been proposed.

Japanese Patent Laid-Open No. 2008-171148 discloses a display with a touch sensor, which is stored so as to be wound around a winding shaft. The display is characterized in that a function of the touch sensor is validated and invalidated according to a quantity of deploying the display from the winding shaft, and is able to prevent an erroneous operation caused by erroneously receiving a touch operation while the display is deployed from the winding shaft.

In Japanese Patent Laid-Open No. 2008-171148, the display is stored so as to be wound around the winding shaft and becomes usable when being deployed from the winding shaft, and is thus difficult to be used in any shape. Though it is expected that a display having excellent flexibility is more likely to be required to be operated in any shape, nothing is seen to be discussed in Japanese Patent Laid-Open No. 2008-171148 for erroneous detection due to folding of the display after being deployed from the winding shaft.

SUMMARY

In view of the aforementioned, aspects of the present invention are seen to provide improved operability of a display apparatus including a display device capable of touch input.

A display apparatus including a flexible display device includes a touch detection unit configured to detect a touch operation to the display device, a bending detection unit configured to detect a bending state of the display device, and a control unit configured to control an operation according to a touch operation depending on the detected bending state, in which the control unit differentiates the operation according to the touch operation between a case where a portion of the display device, which is less than a predetermined bending amount, greater than a predetermined area and a case where the portion that is less than the predetermined bending amount is less than the predetermined area.

Further features of aspects of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings.

It is to be noted that the following exemplary embodiment is merely one example for implementing aspects of the present invention and can be appropriately modified or changed depending on individual constructions and various conditions of apparatuses to which aspects of the present invention are applied. Thus, aspects of the present invention are in no way limited to the following exemplary embodiment.

Exemplary embodiments of the invention will be described in detail below with reference to the accompanying drawings.

Figure 1:
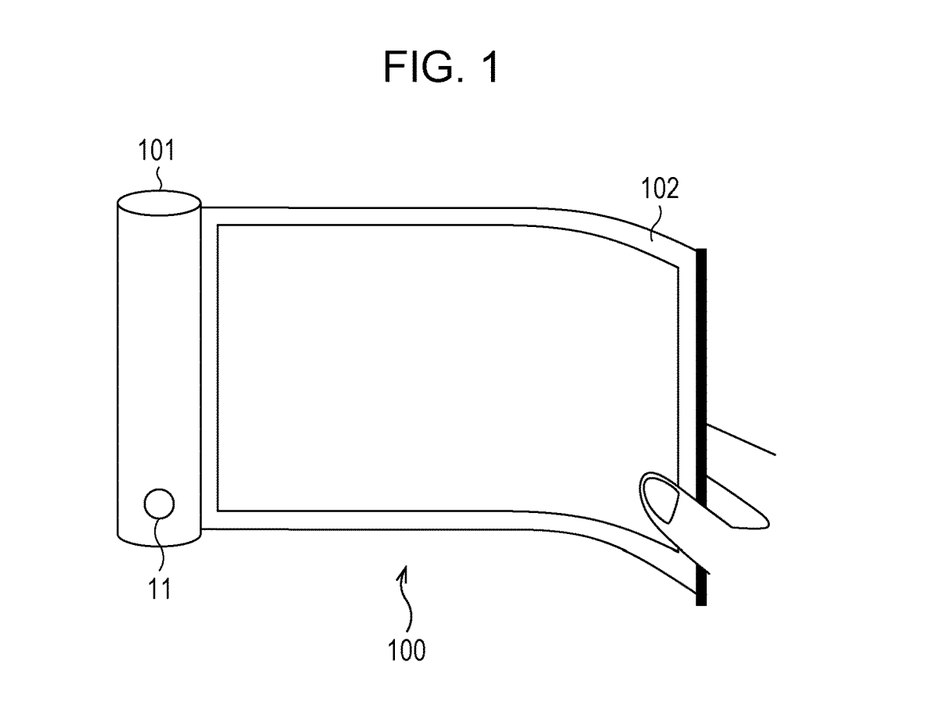
FIG. 1 is an external view of a display apparatus according to an exemplary embodiment of the invention.

FIG. 1 is an external view of a display apparatus 100 with a configuration of an exemplary embodiment of the invention and illustrates a state where a display device 102 is deployed.

A housing 101 is a housing in a hollow cylindrical shape for storing the display device 102. A display winding shaft, a spring unit, and a lock unit (all not illustrated) for fixing the display device 102 are provided inside the housing 101.

When the display device 102 is extended and deployed, the display device 102 is fixed by the lock unit while being deployed. The lock unit is constituted by a ratchet mechanism and is able to fix the display device 102 with any deployment quantity. When the display device 102 is extended again with the display device 102 fixed, the lock is released and the display device 102 is wounded around the winding shaft by a restoring force of the spring so as to be able to be stored in the housing 101. The display device 102 is constituted by a display unit 20 and a touch sensor 23.

Figure 2:
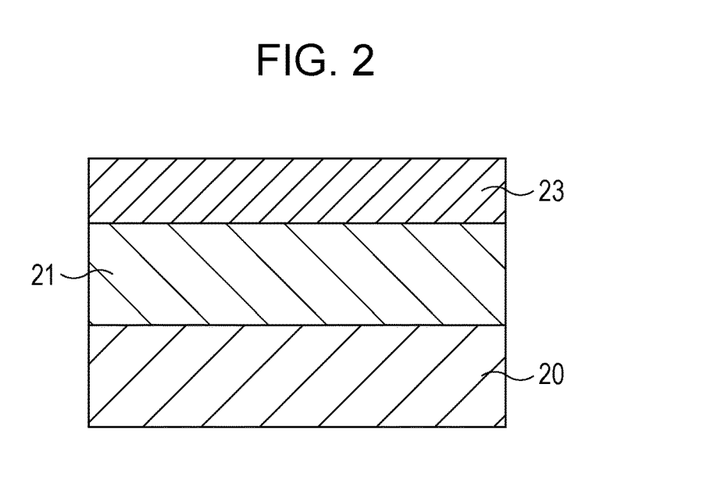
FIG. 2 is a cross-sectional view of a display device according to the exemplary embodiment of the invention.

FIG. 2 is a cross-sectional view of the display device 102 that is formed by laminating the display unit 20, a bending sensor 21, and the touch sensor 23. Each layer is made of a flexible material, such as a resin substrate or a plastic film, and is able to be freely curved.

Figure 3:
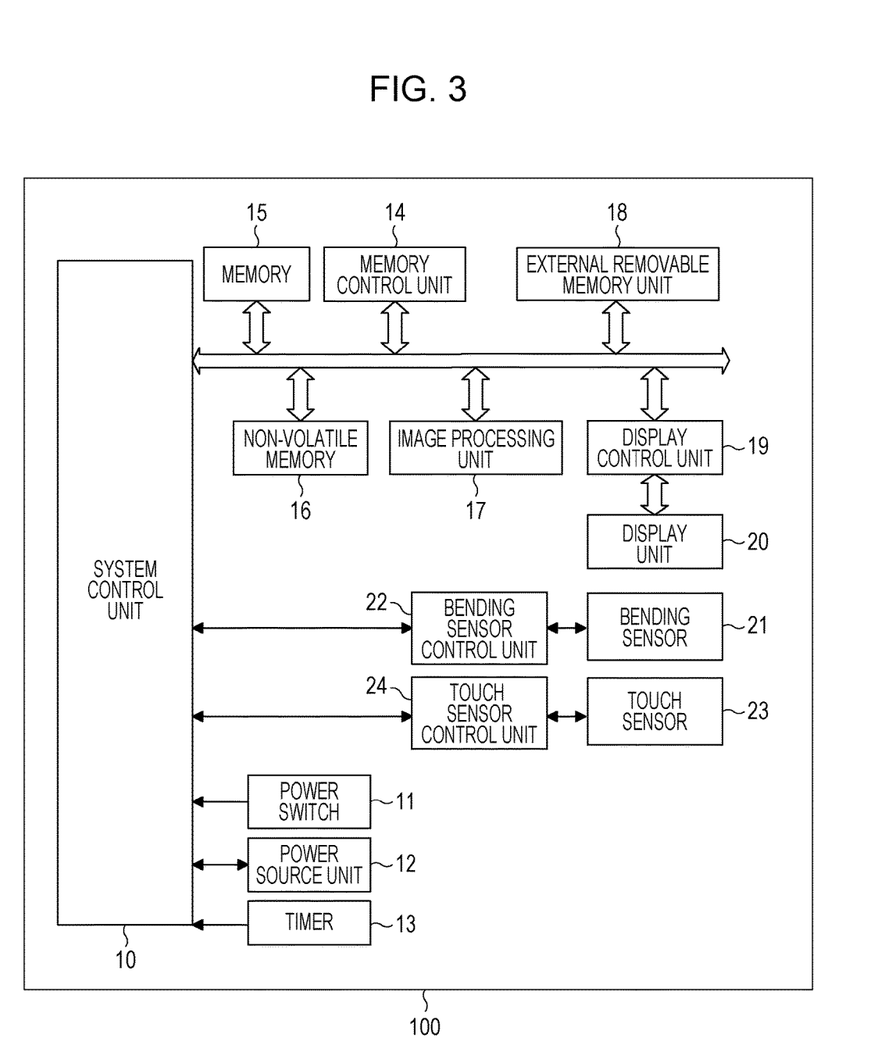
FIG. 3 is a block diagram illustrating a configuration example of the display apparatus according to the exemplary embodiment of the invention.

FIG. 3 is a block diagram illustrating a configuration example of the display apparatus 100 in the present exemplary embodiment. In FIG. 3, a system control unit 10 is a central processing unit that controls the display apparatus 100.

A power switch 11 switches and sets power on and power off modes of the display apparatus 100. A power source unit 12 is constituted by a battery, a battery detecting circuit, a DC-DC converter, a switch circuit for switching a conducting block, etc., and detects whether the battery is loaded, a type of the battery, and a remaining battery capacity. The power source unit 12 controls the DC-DC converter based on a detection result and an instruction from the system control unit 10 so as to supply required voltages to block units during a required period.

A timer 13 includes a clock function, a calendar function, a timer counter function, and an alarm function. The timer is used for system management to manage shifting time to a sleep mode and an alarm notice, etc.

A memory control unit 14 controls transmission and reception of data among the system control unit 10, an image processing unit 17, the display unit 20, an external removable memory unit 18, and a memory 15. Data in the external removable memory unit 18 and data in a non-volatile memory 16 are written in the memory 15 via the image processing unit 17 and the memory control unit 14. The memory control unit 14 includes a direct memory access control function enabling high-speed transfer and can directly transfer data to the image processing unit 17 without using the system control unit 10.

The memory 15 is a high-speed volatile memory for storing image data for display and includes sufficient storage capacity to store a predetermined number of still images and moving images. The memory 15 includes a program stack area, a status storage area, a calculating area, a working area, and an image display data area for the system control unit 10. Various calculations are performed by the system control unit 10 using the calculation area of the memory 15.

The non-volatile memory 16 is an electrically erasable and recordable memory, and for example, a flash memory, EEPROM, etc., is used. Menu setting information and a control program for the display apparatus 100 are stored in the non-volatile memory 16. The non-volatile memory 16 also stores data necessary to configure display image data, such as character font data, icon data, menu items, menu backgrounds, and color palette information.

The image processing unit 17 converts display data stored in a memory area for image display allocated to the memory 15 into a data format displayable on the display unit 20, and outputs horizontal/vertical synchronizing signals and dot clock signals. The image processing unit 17 includes a contrast change function for executing a gain correction to a luminance signal of display data, and a color gradation change function for executing quantization processing after error diffusion calculation processing and dither calculation processing to pixels of display data.

The external removable memory 18 performs recording and reading of an image file in and from a recording medium, such as a CompactFlash® card or an SD card.

A display control unit 19 generates and supplies a driving timing signal and power voltage for driving the display unit 20. The display control unit 19 performs matrix transformation correction, picture correction, brightness correction, contrast correction, gamma correction, flip horizontal and flip vertical display control, and display position adjustment for display data from the image processing unit 17 by setting communication with the system control unit 10.

The display unit 20 is constituted so that, an organic EL (Electro-Luminescence) element in which pixels are arranged is formed on a flexible substrate, for example, such as a resin-made plastic substrate. The display unit 20 has flexibility and is able to be freely curved with an image displayed thereon.

The bending sensor 21 is a sensor for detecting a bending amount and a bending position of the display unit 20, and is formed by two films called resistive films in which transparent electrodes, for example, such as ITO (Indium Tin Oxide) are arranged in a matrix manner. The two resistive films are arranged to face each other and predetermined voltage is applied to an electrode of one of the resistive films. When the display unit 20 is bent, a resistance value between electrodes arranged at the bent position changes and voltage according to a bending amount is generated in an electrode of the other resistive film. Thus, by detecting positions of the electrodes at which the resistance value is changed and an amount of change of the voltage, the bending position and the bending amount of the display unit 20 is detected.

A bending sensor control unit 22 is a control unit used for controlling the bending sensor 21. The bending sensor control unit 22 includes an offset subtraction unit that subtracts a sensor output value at a time of a plane state having no bending amount from an output value of the bending sensor 21, and a programmable gain unit that amplifies the output value subjected to the offset subtraction with any gain value. The bending sensor control unit 22 also includes a determination unit that determines whether sensor output data is greater than any threshold. A position, the bending amount of which is determined as being greater than the threshold, is set as the bending position. The calculated bending position and bending amount are transmitted to the system control unit 10. The system control unit 10 performs first calculation processing to calculate, using the bending position and the bending amount, an area of a portion where the bending amount is less than the threshold.

The touch sensor 23 uses a resistive film method, a capacitive method, or the like as a touch detection method. Similarly to the bending sensor 21, the touch sensor 23 is formed by a flexible film in which transparent electrodes, for example, such as ITO (Indium Tin Oxide) are arranged in a matrix manner. Since the resistive film method has similar principles to that of the bending sensor 23, the bending sensor 21 and the touch sensor 23 can be implemented as single sensor. In the case of the capacitive method, presence or absence of a touch is determined by detecting a value of capacitance generated between ITO electrodes. When a conductor, such as a finger, is close to the touch sensor 23, capacitance is generated between an ITO electrode and the finger so that a value of the capacitance generated between ITO electrodes changes.

A touch sensor control unit 24 includes a baseline subtraction unit that subtracts a sensor output value when nothing is in touch (referred to as a baseline value) from an output value of the touch sensor 23, and a programmable gain unit that amplifies the output value subjected to the baseline subtraction with any gain value. The touch sensor control unit 24 also includes a touch determination unit that determines presence or absence of a touch by judging whether the output value exceeds any threshold (referred to as a touch determination threshold). The touch sensor control unit 24 calculates a touch position from an output value of each sensor and transmits a calculation result to the system control unit 10. The touch sensor control unit 24 includes a calibration function for resetting a baseline value, an output gain, and a threshold to appropriate values upon an instruction of the system control unit 10.

In the present exemplary embodiment, the system control unit 10 controls operations of the touch sensor 23 and the touch sensor control unit 24 according to a degree of the bending amount of the display unit 20.

Next, an outline of the calibration function will be described.

Figure 4A:
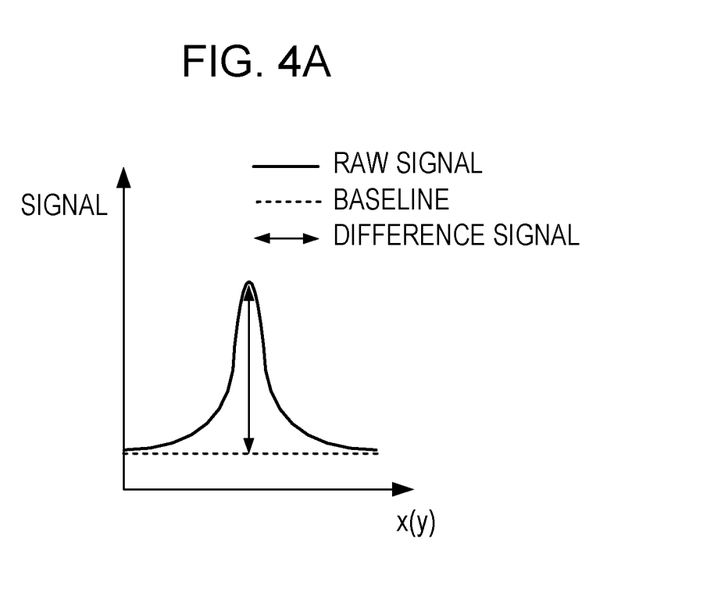
FIG. 4A illustrates a relationship between a sensor output value and a baseline value when something is in touch according to the exemplary embodiment of the invention.
Figure 4B:
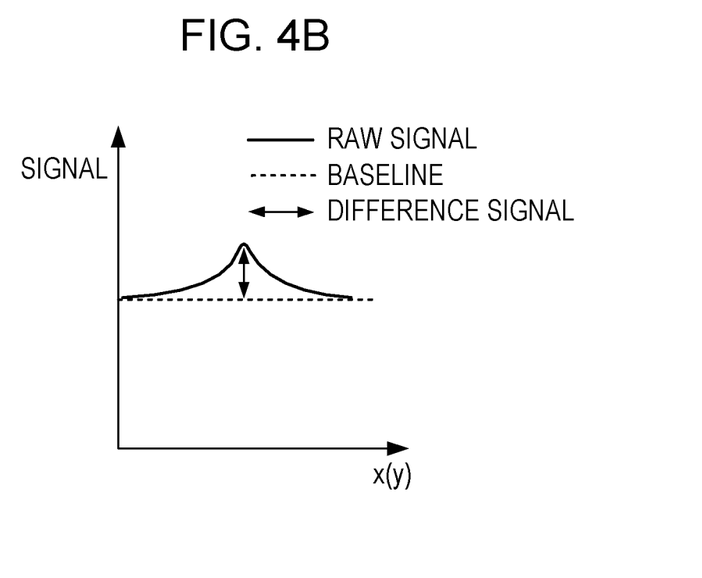
FIG. 4B illustrates a relationship between a sensor output value and a baseline value when only the baseline value is reset according to the exemplary embodiment of the invention.

In FIGS. 4A and 4B, the solid line denotes an output value (raw signal) of the touch sensor 23 and the dotted line denotes a baseline value (baseline) indicating a touch sensor output value when nothing is in touch. A double-headed arrow denotes an output value (difference signal) obtained after subtracting a baseline value from a touch sensor output value.

FIG. 4A illustrates a sensor output value when something is in touch and a baseline value. The output value after baseline subtraction indicates a value that is sufficient to exceed the touch determination threshold. However, the sensor output value changes depending on a shape of the display device 102 and a surrounding environment condition.

For example, in the case of a touch sensor of the resistive film method, the sensor output value when nothing is in touch increases according to the bending amount of the display device 102. In the case of the capacitive method, the sensor output value changes due to a change of a distance from a conductor in the periphery and a change of a distance between ITO electrodes caused by bending the display device 102. Thus, the baseline value is reset according to the shape of the display device 102 and the environmental condition.

FIG. 4B illustrates a sensor output value when something is in touch and a baseline value in a case where only the baseline value is reset.

In FIG. 4B, the output value after baseline subtraction does not achieve a value that is sufficient to exceed the touch determination threshold. When the baseline value is reset, the gain value and the touch determination threshold are changed to values sufficient for detecting a touch. With the calibration function, the output gain of the sensor output value, the baseline value, and the touch detection determination threshold can be changed to appropriate values.

The system control unit 10 can detect the following operations or states on the touch sensor 23:

Touching of the touch sensor 23 with a finger or a pen (hereinafter, referred to as a touch-down).

A state in which the touch sensor 23 is being touched with a finger or a pen (hereinafter, referred to as a touch-on). (please remove the paragraph number for this paragraph)

Movement of a finger or a pen while the finger or pen touches the touch sensor 23 (hereinafter, referred to as a touch-move). (please remove the paragraph number for this paragraph)

Removal of a finger or a pen that was touching the touch sensor 23 (hereinafter, referred to as a touch-up). (please remove the paragraph number for this paragraph)

A state in which the touch sensor 23 is not being touched (hereinafter referred to as a touch-off). (please remove the paragraph number for this paragraph)

These operations/states and position coordinates at which a finger or a pen is touching the touch sensor 23 are provided to the system control unit 10 via an internal bus. The system control unit 10, based on the received information, determines the operation that has been performed on the touch sensor 23. In the case of a touch-move, a moving direction in which a finger or a pen moves on the touch sensor 23 can be determined, based on changes in the position coordinates, with respect to each of a vertical component and a horizontal component on the touch sensor 23.

When a touch-up is performed after performing a touch-move from a touch-down on the touch sensor 23, it is determined that a stroke has been drawn. An operation of quickly drawing the stroke is referred to as a flick. The flick is an operation in which a finger is moved by a certain distance while touching the touch sensor 23 and then removing the finger. In other words, the flick is an operation where the finger is quickly moved over the touch sensor 23, as if flicking the touch sensor 23 with the finger.

When it is detected that a touch-move has been performed for a distance greater than or equal to a predetermined distance at a speed greater than or equal to a predetermined speed, and a touch-up is detected, it can be determined that a flick has been performed. When it is detected that a touch-move has been performed for a distance greater than or equal to a predetermined distance at a speed less than a predetermined speed, it can be determined that a drag has been performed. An operation of performing a touch-up without performing a touch-move after performing a touch-down is referred to as a tap operation.

First Exemplary Embodiment

Figure 5:
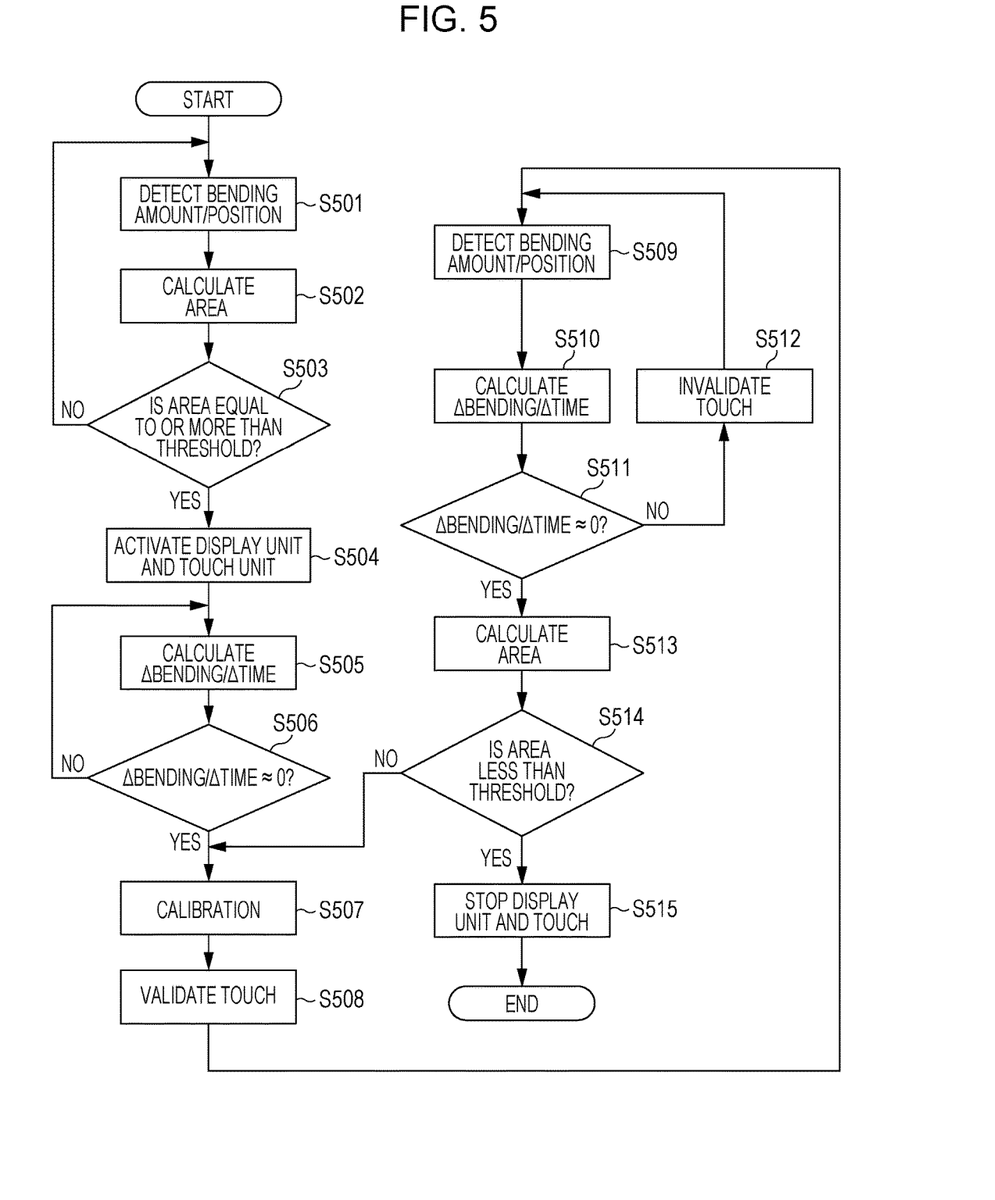
FIG. 5 is a flowchart illustrating a processing operation of the display apparatus according to the exemplary embodiment of the invention.

A first exemplary embodiment of the invention will be described below with reference to a flowchart of FIG. 5. The flowchart of FIG. 5 is realized when the system control unit 10 loads a program recorded in the non-volatile memory 16 in a work memory area of the memory 15 and executes the program to control each unit of the display apparatus 100.

Starting to extend and deploy the display device 102 of the display apparatus 100 from a state in which the display device 102 is being stored in the housing 101 is set as a start. When the power switch 11 is turned on while the display device 102 is stored in the housing 101, the system control unit 10 and peripheral blocks, such as the memory 15, are activated.

When a release of the lock unit of the display device 102 in the housing 101 is detected, the system control unit 10 judges that deployment of the display device 102 is started and the bending sensor 21 and the bending sensor control unit 22 are activated. Power is not supplied to the display unit 20, the touch sensor 23, or the touch sensor control unit 24 in order to suppress power consumption at the time of the start.

At S501, the system control unit 10 determines a position, at which a bending amount is greater than a predetermined threshold, as a bending position based on an output value of the bending sensor control unit 22, and calculates the bending position and the bending amount.

Figure 6A:
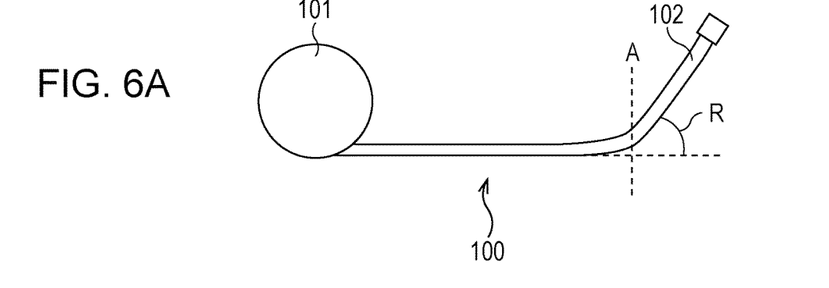
FIG. 6A is an external view of the display apparatus when viewed from a bottom surface side.

FIG. 6A illustrates the display apparatus 100 with the display device 102 bent, when viewed from a bottom surface of the display apparatus 100. In FIG. 6A, a portion represented by A is a position where the display device 102 is determined as being bent and R represents a bending amount.

At S502, based on a result of S501, the system control unit 10 calculates an area of a part in which the display device 102 of the display apparatus 100 is not bent, i.e., a flat portion.

Figure 6B:
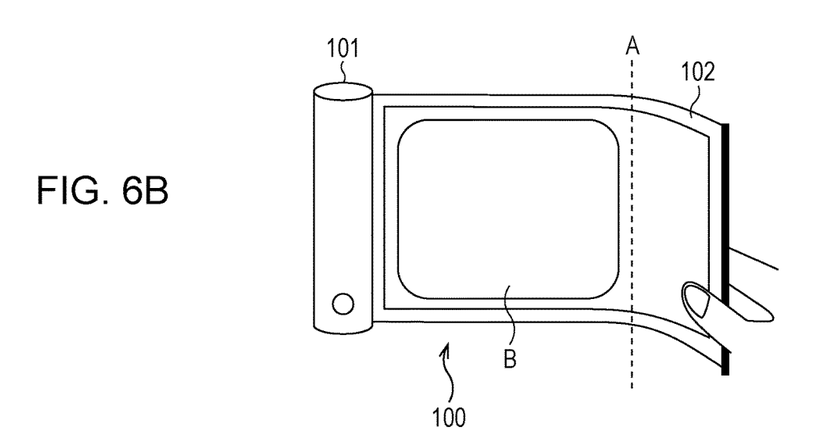
FIG. 6B is an external view of the display apparatus for explaining a flat portion of the display device.

FIG. 6B illustrates the display apparatus 100 with the display device 102 bent, when viewed from a display surface side of the display apparatus 100. A denotes a bending position and B denotes a part regarded as a flat portion.

At S503, the system control unit 10 determines whether an area of the flat portion calculated at S502 is greater than or equal to a predetermined threshold. When the system control unit 10 determines that the area is greater than or equal to the predetermined threshold, the procedure shifts to S504. If the determination is that the area is less than the threshold, the procedure shifts back to S501.

When the area of the flat portion is greater than or equal to the threshold at S503, it can be judged that the display device 102 is being deployed to an extent of enabling image viewing. At S504, the system control unit 10 activates the display unit 20, the touch sensor 23, and the touch sensor control unit 24. Since it can be judged from the determination of S503 that the display device 102 is being deployed to an extent of enabling image viewing, a menu screen and the like are displayed on the display unit 20.

At S504, the system control unit 10 performs power supply and initial setting in order to make the touch sensor 23 and the touch sensor control 24 ready for an operation and touch detection remains invalidated. Invalidation of the touch detection refers to a state where the display apparatus 100 is not operable even when a user touches the touch sensor 23 of the display device 102.

For example, an output of the touch sensor 23 or the touch sensor control unit 24 can be stopped according to an instruction of the system control unit 10. Alternatively, a method in which an output of the touch sensor 23 or the touch sensor control unit 24 is performed but an output result is ignored by the system control unit 10 can be used.

At S505, the system control unit 10 performs second calculation processing to calculate a time change rate of the bending amount by observing the time change rate of the bending amount for a fixed time while counting an output value from the bending sensor control unit 22.

The system control unit 10 determines whether the time change rate of the bending amount is less than a predetermined threshold at S506. When it is less than the threshold, the system control unit 10 determines that the time change rate of the bending amount is sufficiently small and shifts to S507. When it is greater than or equal to the threshold, the procedure shifts to S505. When the system control unit 10 determines that the time change rate of the bending amount is sufficiently small at S506, it can be judged that a shape change of the display device 102 is stopped and the deployment is completed.

When the time change rate of the bending amount is greater than the threshold at S506, it can be determined that the shape of the display device 102 is still being changed.

At S507, the system control unit 10 performs setting of a baseline value, a gain value, and a touch determination threshold with the calibration function of the bending sensor control unit 22. By performing calibration while the shape of the display device 102 is determined as being fixed, according to the determination at S506, the system control unit 10 sets the baseline value, the gain value, and the touch determination threshold to values optimum for the display shape and the environmental condition.

At S508, the system control unit 10 validates touch detection by the touch sensor 23 and the touch sensor control unit 24. Validation of the touch detection refers to a state where the display apparatus 100 is operable when the user touches the touch sensor 23 of the display device 102. By validating a touch when it is judged according to the determination at S506 that the shape change of the display device 102 is stopped, an erroneous operation caused by receiving a touch operation erroneously during deployment of the display device 102 can be prevented.

At S509, the system control unit 10 calculates the bending position and the bending amount similarly to S501. At S510, the system control unit 10 calculates the time change rate of the bending amount similarly to S505.

At S511, the system control unit 10 determines whether the time change rate of the bending amount is less than the predetermined threshold similarly to S506. When it is less than the threshold, the procedure shifts to S513. When it is greater than or equal to the threshold, the procedure shifts to S512.

Since it can be judged according to the determination at S511 that the shape of the display device 102 is still being changed, the system control unit 10 invalidates the touch detection by the touch sensor 23 and the touch sensor control unit 24 at S512 and shifts back to S509. This enables prevention of an erroneous operation caused by receiving a touch operation erroneously while the shape of the display device 102 is being changed.

At S513, the system control unit 10 calculates an area of a part regarded as a flat portion in the display unit 102 similarly to S502.

At S514, the system control unit 10 determines whether the area of the flat portion calculated at S513 is greater than or equal to the predetermined threshold similarly to S503. When the system control unit 10 determines that the area of the flat portion is greater than or equal to the threshold, it can be judged that the display device 102 is fixed to a new shape while being deployed to an extent of enabling image viewing, and the procedure shifts to S507 to perform calibration again. When the system control unit 10 determines that the area of the flat portion is less than the threshold, the procedure shifts to S515.

At S515, since it can be judged according to the determination at S514 that the display device 102 is being stored to an extent of not enabling image viewing, the system control unit 10 stops the display control unit 19, the display unit 20, the touch sensor 23, and the touch sensor control unit 24.

In the present exemplary embodiment, by detecting the bending position and the bending amount of the display device 102, determination is made whether the display device 102 is deployed to an extent of enabling image viewing. The display unit 20, the touch sensor 23, and the touch sensor control unit 24 are activated or stopped based on the determination results. This enables reduction in power consumption when appropriate.

The present exemplary embodiment also provides for determining whether the display device 102 is deployed to an extent of enabling image viewing. Validation and invalidation of a touch is switched based on the determination results. This enables prevention of an erroneous operation caused by erroneously performing a touch operation while the display device 102 is being extended and deployed.

In the present exemplary embodiment only reception of a touch is invalidated and displaying of the display is continued as it is. Thereby, usability that flexibility of the flexible display is sufficiently utilized while preventing an erroneous operation of a touch panel when the user holds and bends the display for easy viewing is provided.

By observing the time change rate of the bending amount, it can be determined whether the shape of the display device 102 is being changed and setting of validation and invalidation of a touch is switched based on the determination results. This enables preventing an erroneous touch operation while the shape of the display device 102 is being changed. By performing the calibration of the touch sensor 23 each time the shape of the display device 102 changes, a touch operation can be performed under optimal conditions for the shape of the display device 102 and the surrounding environment, thus achieving an effect of improving operability.

Though the above-description of the flowchart of FIG. 5 presumes that the bending sensor 21 and the touch sensor 23 are different sensors, the sensors can be shared. In this case, the touch sensor 23 is activated at S501 instead of at S504.

The flowchart of FIG. 5 has been described by assuming that a valid range of the touch sensor 23 is a whole surface of the display device 102. However, the bent portion of the display device 102 is difficult to be touched, so that the valid range of the touch sensor 23 can be limited. For example, only a touch on a flat portion B illustrated in FIG. 6B can be validated. Validation of only the flat portion achieves an effect of improving operability.

When only the flat portion is validated, the calibration at S507 can be carried out only on the flat portion. By limiting a range of the calibration, the time for the calibration can be shortened. In such a case, a display where the user can grasp that a touch operation is invalid is performed. For example, a message of "a touch operation is invalid from right side of here" is displayed in a lower portion of the display device 102 at an A-line at which the display device 102 is bent.

Figure 6C:
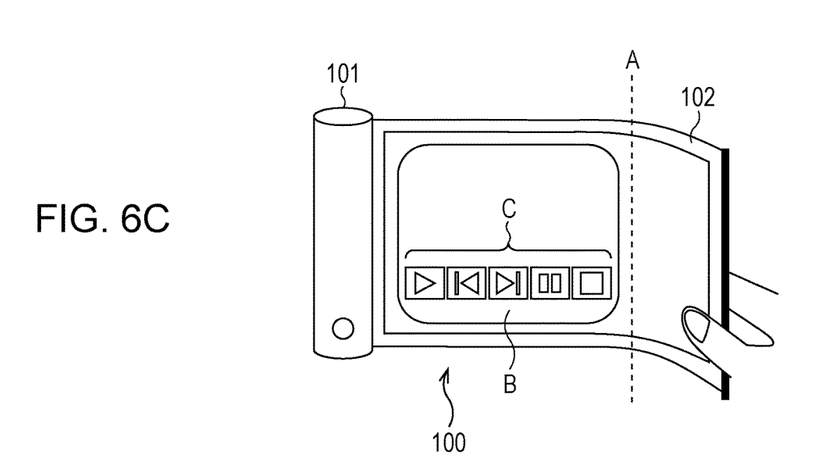
FIG. 6C is an external view of the display apparatus for explaining arrangement of a touch operation icon on the flat portion of the display device.

Control for displaying touch operation icons in the flat portion can be performed. Icons illustrated by C in FIG. 6C are touch operation icons for performing setting of the display apparatus 100 by each touch operation. By moving the touch operation icons C within a touch valid range B at all times, an effect of improving operability is achieved. In this case, displays other than icons, which are not required to be touched, remain displayed continuously on a portion that is not flat.

When the A-line where the display device 102 is bent, moves leftward and a side of the display device 102, which is held by the user with the user's right hand, is in a wider flat area across the A-line, the touch valid range can be moved to the wider flat area. In particular, a display that is required to be touched like an icon is moved.

In the bent state, a complicated operation such as touch gesture for instructing input contents by combining a flick or move operation with a specific pattern is more likely to be erroneously detected compared to a simple operation such as a tap operation for selecting an icon. Thus, the tap operation is validated and the flick or move operation is invalidated in the bent area. This enables a minimum required operation while reducing possibility of an erroneous detection.

Aspects of the invention are not limited to the exemplary embodiments above and may be variously modified and changed.

For example, in another exemplary embodiment, when the power switch 11 is turned on while the display device 102 is being stored in the housing 101, any or all of the display control unit 19, the display unit 20, the touch sensor 23, and the touch sensor control unit 24 are activated. This achieves an effect of shorting an activation time of each device even though power consumption increases.

Similarly, though the display control unit 19, the display unit 20, the touch sensor 23, and the touch sensor control unit 24 are stopped at S515, only a touch operation by the touch sensor 23 can be invalidated.

Though description has been provided for the calibration where all of the baseline value, the gain value, and the touch determination threshold are changed, just one of the values can be changed.

In the above-described exemplary embodiment, the display unit 20 is constituted by an organic EL element, but can be constituted by using, for example, a liquid crystal element as long the display unit has flexibility.

In the present exemplary embodiment, though a resistive film method in which the bending sensor 21 is formed by ITO electrodes is used, a configuration using, for example, a piezoelectric element or the like can be used as long as the bending amount and the bending position are able to be detected.

Though the above-described exemplary embodiment describes that the display device 102 is stored in the housing 101, the housing 101 is not always required. For example, the display device 102 can be configured to be foldable. Aspects of the invention are able to be applied to any type of flexible display.

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-188408, filed on Sep. 25, 2015, which is hereby incorporated by reference herein in its entirety.

What is claimed is:

1. A display apparatus including a flexible display device, comprising:
   a touch detection unit configured to detect a touch operation to the display device;
   a bending detection unit configured to detect a bending state of the display device; and
   a control unit configured to control an operation according to a touch operation depending on the detected bending state,
   wherein the control unit differentiates the operation according to the touch operation between a case where a portion of the display device, which is less than a predetermined bending amount, is greater than a predetermined threshold and a case where the portion that is less than the predetermined bending amount is less than the predetermined threshold, wherein the bending detection unit detects a bending position and a bending amount of the display device, wherein the control unit includes a first calculation unit configured to calculate an area of the portion, which is less than the predetermined bending amount, based on the detected bending position and the detected bending amount, and wherein the control unit activates the touch detection unit when the area calculated by the first calculation unit is greater than a predetermined threshold and stops the touch detection unit when the area calculated by the first calculation unit is less than the predetermined threshold.

2. The display apparatus according to claim 1, wherein the control unit performs control to operate the touch detection unit in a case where the portion that is less than the predetermined bending amount is greater than the predetermined threshold, and not to operate the touch detection unit in a case where the portion that is less than the predetermined bending amount is less than the predetermined area.

3. The display apparatus according to claim 1, wherein the control unit performs control to execute processing according to the detected touch operation in a case where the portion of the display device, which is less than the predetermined bending amount, is greater than the predetermined threshold, and not to execute the processing according to the touch operation in a case where the portion that is less than the predetermined bending amount is less than the predetermined threshold.

4. The display apparatus according to claim 1, wherein the control unit further validates a detected touch operation when the area calculated by the first calculation unit is greater than the predetermined threshold and invalidates the detected touch operation when the area calculated by the first calculation unit is less than the predetermined threshold.

5. The display apparatus according to claim 4, further comprising a second calculation unit configured to calculate a time change rate of a detected bending amount, wherein the control unit validates a detected touch operation when the time change rate of the bending amount calculated by the second calculation unit is less than a predetermined threshold and invalidates the detected touch operation when the time change rate of the bending amount calculated by the second calculation unit is greater than the predetermined threshold.

6. The display apparatus according to claim 4, wherein the control unit validates a detected touch operation for a portion where the area detected by the first calculation unit is greater than the predetermined threshold.

7. The display apparatus according to claim 1, further comprising a change unit configured to change at least an output gain of a sensor output value of the touch detection unit, a baseline value, or a touch detection determination threshold, wherein the change unit changes at least one of the output gain, the baseline value, or the touch detection determination threshold when the area detected by the first calculation unit is greater than the predetermined threshold.

8. The display apparatus according to claim 7, wherein the change unit changes at least one of the output gain, the baseline value, or the touch detection determination threshold when a time change rate of the bending amount is less than a predetermined threshold.

9. The display apparatus according to claim 7, wherein the change unit changes at least one of the output gain, the baseline value, or the touch detection determination threshold for a portion where the area detected by the first calculation unit is greater than the predetermined threshold.

10. The display apparatus according to claim 1, wherein a touch operation icon is displayed on a portion where the area detected by the first calculation unit is greater than the predetermined threshold.

11. The display apparatus according to claim 1, wherein the control unit further activates the display device when the area detected by the first calculation unit is greater than the predetermined threshold and stops the display device when the area detected by the first calculation unit is less than the predetermined threshold.

12. A control method of a display apparatus including a flexible display device, the control method comprising:

a touch detection step of detecting a touch operation to the display device;

a bending detection step of detecting a bending state of the display device; and a control step of controlling an operation according to a touch operation depending on the detected bending state, wherein the control step differentiates the operation according to the touch operation between a case where a portion of the display device, which is less than a predetermined bending amount, is greater than a predetermined threshold and a case where the portion that is less than the predetermined bending amount is less than the predetermined threshold, wherein a bending position and a bending amount of the display device is detected, wherein an area of the portion, which is less than the predetermined bending amount, is calculated based on the detected bending position and the detected bending amount, and wherein detecting a touch operation is enabled when the calculated area is greater than a predetermined threshold and disabled when the calculated area is less than the predetermined threshold.

13. A non-transitory computer readable storage medium storing computer executable instructions causing a computer to execute a control method of a display apparatus including a flexible display device, the control method comprising:

detecting a touch operation to the display device;

detecting a bending state of the display device; and controlling an operation according to a touch operation depending on the detected bending state, wherein the operation according to the touch operation is differentiated between a case where a portion of the display device, which is less than a predetermined bending amount, is greater than a predetermined threshold and a case where the portion that is less than the predetermined bending amount is less than the predetermined threshold, wherein a bending position and a bending amount of the display device is detected, wherein an area of the portion, which is less than the predetermined bending amount, is calculated based on the detected bending position and the detected bending amount, and wherein detecting a touch operation is enabled when the calculated area is greater than a predetermined threshold and disabled when the calculated area is less than the predetermined threshold.

* * * * *